Patented Nov. 18, 1924.

1,515,723

UNITED STATES PATENT OFFICE.

OSCAR BRANDENBERGER, OF ZURICH, SWITZERLAND, ASSIGNOR TO THE FIRM SUBOX A. G., OF ZURICH, SWITZERLAND.

PROCESS OF MANUFACTURING BUILDING MATERIALS.

No Drawing. Application filed March 21, 1924. Serial No. 700,960.

*To all whom it may concern:*

Be it known that I, OSCAR BRANDENBERGER, engineer, a citizen of the Swiss Confederation, residing at Langstrasse 187, Zurich, Switzerland, have invented new and useful Improvements in Processes of Manufacturing Building Materials, of which the following is a specification.

The invention consists of a process of producing a new material for building purposes, especially for lining or covering walls and roofs, and for protecting walls and the like from moisture. The object of the invention is to produce a weather-proof and moisture-proof covering which is also resistant to the action of dilute acids and the like. According to the novel process, paper, cardboard, or a shaped body of vegetable fibre is coated or saturated or otherwise mixed with suboxide of lead $Pb_2O$ and with a substance which reduces suboxide of lead. It has been found that in the presence of reducing agents, such as for example drying oils (linseed oil), lead suboxide is reduced to metallic lead which retains firm adhesion to the carrier. With paper, cardboard, etc., this makes a building material which is comparatively very light, but otherwise has properties of pure lead. For the carrier there may be used any substance which can be worked up into paper, for example wood shavings, cellulose, cotton, hemp, jute, rags, straw or peat. The admixing of the lead suboxide and the reducing agent may be done during the manufacture of the paper or cardboard, in the beating cylinder in front of the machine, or later.

For making roof-board, for example, the paper is manufactured in the usual way and coated with suboxide of lead mixed with a binder such as for example linseed oil, the coating being applied on one side, or both. In a short time the coating is converted into a layer of lead which adheres firmly to the paper. Or paper, cardboard or the like is saturated with a mixture of lead suboxide and a reducing binding agent; the mixture may be heated. The lead suboxide may be mixed with other lead oxides or other metal compounds. It is, however, important that there should be an excess of lead suboxide. The paper, cardboard or shaped body may have usual admixtures such as glue, resin etc. To make durable building elements of great strength the plates or bodies may be subjected to high pressure. They may also be reinforced with metal, which is protected from rust and the like by the lead suboxids.

What I wish to claim by U. S. Letters Patent is:

1. The process of producing a building material consisting in treating building fabric with a mixture of lead suboxide and a substance which reduces lead suboxide.

2. A building fabric treated with lead suboxide and a substance which reduces lead suboxide.

3. Building fabric coated with lead suboxide and a substance which reduces lead suboxide.

4. Building fabric impregnated with lead suboxide and a substance which reduces lead suboxide.

In witness whereof I affix my signature.

OSCAR BRANDENBERGER.